June 13, 1950     C. W. WEIDAUER     2,511,187
SHEARS
Filed Oct. 16, 1946     2 Sheets-Sheet 1
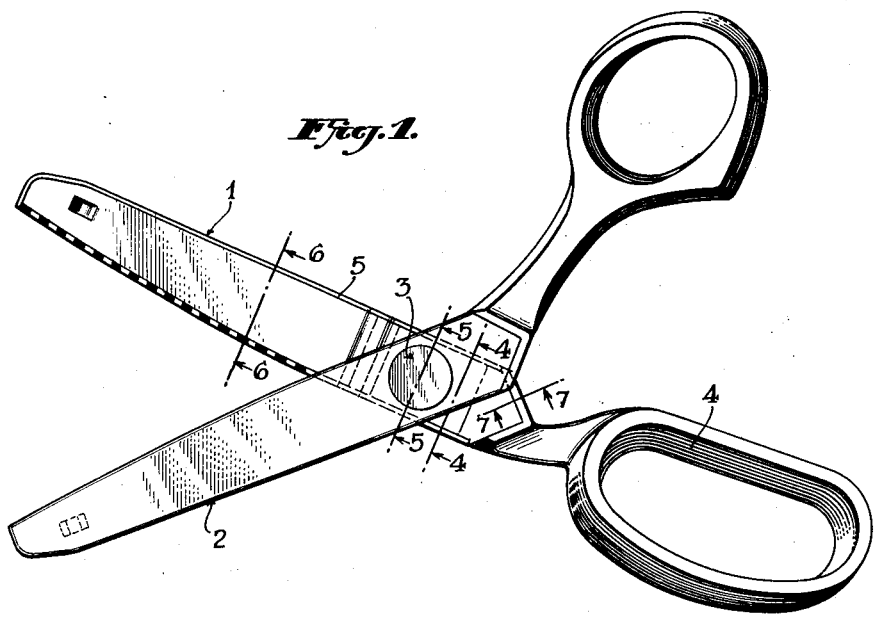
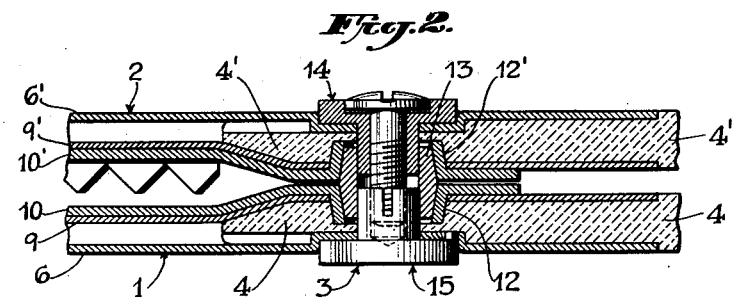
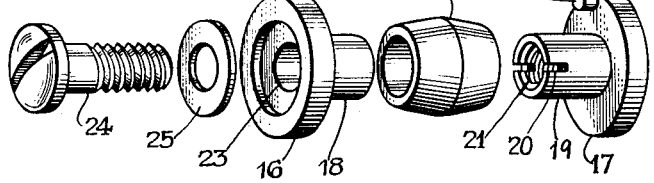
INVENTOR.
CURTIS W. WEIDAUER.
BY
his ATTORNEYS.

June 13, 1950 — C. W. WEIDAUER — 2,511,187
SHEARS
Filed Oct. 16, 1946 — 2 Sheets-Sheet 2
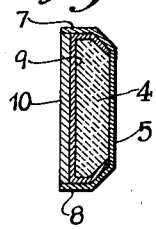
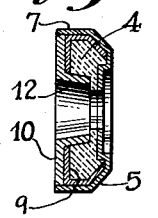
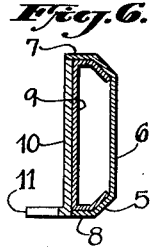
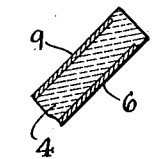
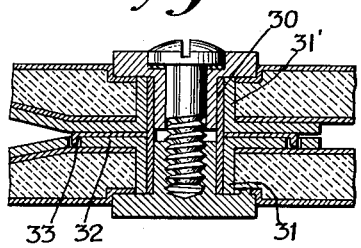
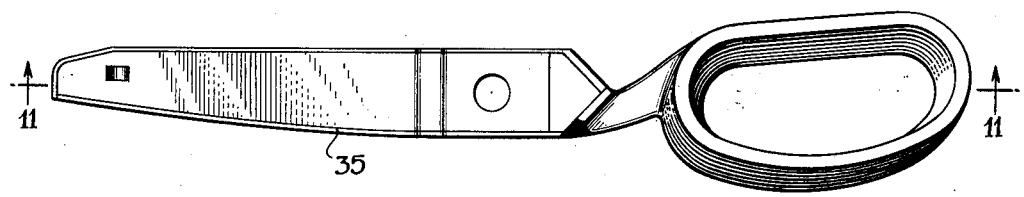
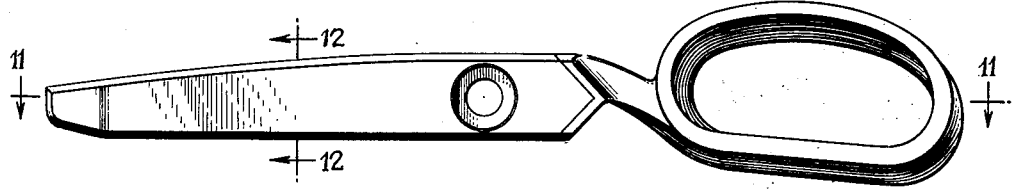
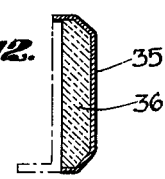
INVENTOR.
CURTIS W. WEIDAUER.
BY Ward Crosby Neal
his ATTORNEYS.

Patented June 13, 1950

2,511,187

UNITED STATES PATENT OFFICE 2,511,187

SHEARS

Curtis W. Weidauer, Manhasset, N. Y., assignor to Philbeck Corporation, New York, N. Y., a corporation of New York Application October 16, 1946, Serial No. 703,531

7 Claims. (Cl. 30—230)

This invention relates to shears for cutting sheet material, and is useful in connection with pinking shears as well as smooth cutting shears. The invention is in the nature of an improvement over the shears forming the subject matter of Kurt Kissling Patent No. 2,284,664 patented June 2, 1942.

An object of the invention is to provide improved structural details permitting effective use of the combination of plastic and sheet metal members so as to provide strength and enhanced appearance while providing desirable manufacturing characteristics.

Another object is to provide improved bearing surfaces and pivoting means.

Further objects and advantages of the invention will more fully appear from the following description taken in connection with the accompanying drawings, which show by way of example the preferred embodiment of the invention.

The invention consists in the novel features, arrangements and combination of parts embodied by way of example in the apparatus hereinafter described as illustrating the present preferred form of the invention, and the invention will be more particularly pointed out in the appended claims.

In the drawings:

Fig. 1 is a plan view of a preferred embodiment of the invention as applied to pinking shears, showing the shears in open position;

Fig. 2 is a sectional view of a portion of the shears shown in Fig. 1, but in closed position, taken along the longitudinal axis of the shears passing through the pivotal axis, showing further details of the parts shown in Fig. 1;

Fig. 3 is an exploded view showing certain of the pivot elements;

Figs. 4, 5, 6 and 7 are cross-sectional views taken at the respective positions correspondingly designated in Fig. 1;

Fig. 8 is a view similar to Fig. 2 showing a modified pivotal arrangement;

Fig. 9 is a plan view showing the inside face of a modified shears frame member;

Fig. 10 is a plan view showing the opposite face of the frame member shown in Fig. 9;

Fig. 11 is a longitudinal sectional view taken at 11—11 of Fig. 10; and

Fig. 12 is a transverse sectional view taken at 12—12 of Fig. 10.

Referring more paticularly to Fig. 1: the frame members are designated in general as 1 and 2 and are pivotally secured together by pivot means designated in general as 3. The construction and arrangement of the frame member 1 will be described in detail, and it will be understood that the frame member 2 is similarly constructed and arranged. The frame member 1 comprises a handle portion 4 which is preferably made of a relatively rigid plastic material, such as "Lucite" and the metal jaw portion 5 is in the general form of a channel whose bottom or closed face 6 (Figs. 4, 5 and 6) is disposed outwardly and the flanges 7 and 8 of which are directed inwardly; the flange 7, opposite the cutting edge zone of the shears, extending inwardly beyond the corresponding opposite flange 8 from the tip of the jaw portion inwardly toward the pivot portion; and preferably the flanges 7 and 8 extend inwardly an equal distance at the zone of the pivot 3. The jaw portion 5 is preferably stamped out, or otherwise suitably formed from sheet metal, and in order to reduce the weight to a minimum I prefer to use aluminum or the like sheet metal or relatively thin sheet metal such as stainless steel. The plastic handle portion 4 is provided with a tongue which is disposed within the jaw member 6 so as to overlap the same through a zone surrounding the pivot 3. In the present embodiment a second jaw portion 9 is made in a manner similar to that above described with reference to a member 6 but with the bottom of the channel or closed face disposed inwardly and the flange portions extending outwardly in opposition to the flanges 7 and 8 of the member 6. The second jaw member is disposed interiorly of the first jaw member and the flanges are preferably inclined toward each other so as to extend partly over the opposite sides of the overlapping portion of the handle 4, as more clearly shown in Figs. 4, 5 and 6.

A suitable detachable cutting blade 10 is disposed against the face of the jaw member 9 with its rear edge in abutting engagement with the flange 7 and its opposite or cutting edge in the present embodiment taking the form of pinking teeth 11. The blade 10 is provided with an integrally formed bearing portion 12 (Fig. 5) disposed in the cooperating bore provided in the frame member 1. Further details of such detachable blade are fully set forth in said Patent No. 2,284,664 and need not be further described herein.

Corresponding parts of the frame member 2 and its associated cutting blade, where referred to hereinafter and in the drawings, will be designated by the same numerals as applied to the parts of the frame member 1 and its associated cutting blade with the addition of the prime suffix.

Referring more particularly to Figs. 1 and 2; with the frames 1 and 2 and their associated blades assembled as above described, the frame members are disposed in super-imposed position and are held in operative relation by the pivot means now to be described. A bushing sleeve 13 is provided with an inner cylindrical bore and an outer surface which tapers oppositely outwardly in an axial direction from a median plane intermediate the cutting blades 10—10'; the tapered exterior of the bushing 13 being disposed in interfitting engagement within corresponding tapers provided by the bushing portions 12—12' carried by the blades 10—10'. The tapers of these members being such that when the bushing portions 12—12' are seated on the bushing sleeve 13 the blades are held in axial alignment for pivotal movement in parallel planes and the faces of the blades 10—10' surrounding the pivotal axis are spaced slightly apart, so that the bearing force axially and radially is exerted against the bushing sleeve 13. A pair of pivot sleeves 14 and 15 are respectively provided with head portions 16—17 (Fig. 3) and stem portions 18—19. The head portions are disposed against the outer faces of the corresponding frame members, and are preferably disposed in suitable recesses provided therein; while the stem portions are disposed within the bushing 13 with their inner ends spaced apart axially. The stem portion 19 is transversely slit as at 20 and is interiorly threaded as at 21, and the head 17 is provided with an inwardly extending dowel pin 22 disposed in a cooperating recess provided in the frame member 6 so as to lock the parts against relative angular movement one with respect to the other about the pivot axis. The pivot sleeve 14 is provided with a smooth bore 23 through which freely passes a pivot screw 24 whose head is preferably disposed within a recess provided in the head 16 and a washer 25 is preferably disposed between the screw 24 and head 16. The threaded end of the screw 24 engages within the hollow split stem 19 in such a manner as to expand the stem 19 outwardly into locking engagement with the bushing 13. From this it will be seen that with the parts in position shown in Fig. 2 the pivot sleeve member 15, the frame 1 and the bushing 13 are firmly locked together and the cutting blade 10 is restrained to move in a cutting direction with the frame 1 by its engagement with the member 6 as above described. It will likewise be understood from the foregoing that the frame member 2 and its associated blade 10' are freely movable in a cutting direction about the pivot axis with respect to the frame member 1 and blade 10.

*Modified pivotal connection*

While I prefer to use the pivotal connection above described employing the double tapered bushing sleeve 13, which permits ready adjustment of the shears while maintaining proper alignment and reduces friction; nevertheless some of the advantages of the pivotal connection above described may be utilized in the form illustrated in Fig. 8, which it will not be necessary to describe in detail except to point out the differences between this modification and the structure disclosed in Fig. 2. In the modified structure a plain cylindrical bushing sleeve 30 is employed and accordingly the bushing portions 31—31' formed integrally with the corresponding cutting blades are cylindrical and freely rotatably engage the exterior surface of the bushing sleeve 30. A suitable thrust washer 32 is disposed between the adjacent inner faces of the cutting blades and is provided with suitable means such as 33 for locking it against rotation with respect to the lowermost blade. Otherwise this pivotal arrangement is identical with that heretofore described, in construction and operation.

*Modified frame members*

In Figs. 9–12, inclusive, I have shown a modified form of blade member in which instead of employing the double metal channel construction above described with reference to Figs. 1–8, inclusive, a single metal channel member such as 35 is employed and the handle portion 36 is provided with a tongue which extends the full length of the metal channel member 35, as will be more clearly seen in Figs. 11 and 12. This embodiment, while embodying many of the novel features described in connection with the previous embodiment, provides a somewhat simplified structure in the elimination of the inner or second channel member.

Having thus described my invention with particularity with reference to the preferred embodiment of the same, and having referred to some of the possible modifications thereof, it will be obvious to those skilled in the art, after understanding my invention, that other changes and modifications may be made therein without departing from the spirit and scope of the invention, and I aim in the appended claims to cover such changes and modifications as are within the scope of the invention.

What I claim is:

1. Shears comprising a pair of frame members provided with registering holes, each of said frame members including a plastic handle portion and a sheet metal jaw portion overlapping in a zone surrounding its said hole, said sheet metal jaw portions being of channel form whose closed faces are disposed outwardly and whose open faces are disposed inwardly relative to each other, said handle portions extending within said respective channels throughout said overlapping zone, detachable cutting blades cooperatively associated respectively with said frame members and having holes in alignment with said registered holes of said frame members, and pivot means passing through said handle portions, said jaw portions and said blades and securing said parts in operative relation.

2. Shears comprising a pair of frame members provided with registering holes, each of said frame members including a plastic handle portion and a sheet metal jaw portion overlapping in a zone surrounding its said hole, said sheet metal jaw portions being of channel form whose closed faces are disposed outwardly and whose open faces are disposed inwardly relative to each other, said handle portions extending within said respective channels throughout said overlapping zone, the side of each jaw channel opposite the cutting edge zone of said shears extending inwardly beyond the respectively opposite side of said channel to provide a shoulder, detachable cutting blades cooperatively associated respectively with said frame members in abutting engagement with said extended channel sides, and pivot means passing through said handle portions, said jaw portions and said blades and securing said parts in operative relation.

3. Shears comprising a pair of frame members provided with registering holes, each of said frame members including a plastic handle portion, and a first sheet metal jaw portion overlapping in a zone surrounding its said hole, said sheet metal jaw portions being of channel form whose bottoms are disposed outwardly and whose side flanges extend inwardly relative to each other, each of said frame members also including a second sheet metal jaw portion of channel form whose side flanges extend in a direction opposite to and are disposed interiorly of the side flanges of said first jaw portion and exteriorly of said handle portion at said overlapping zone, whereby each of said plastic handle portions is encased by first and second sheet metal channel members surrounding its said hole, detachable cutting blades cooperatively associated respectively with said frame members and having holes in alignment with said registered holes of said frame members, and pivot means passing through said handle portions, said jaw portions and said blades and securing said parts in operative relation.

4. Shears comprising a pair of frame members, each of said frame members including a plastic handle portion and a sheet metal jaw portion overlapping in a zone surrounding the pivot axis of said shears, said sheet metal jaw portions being of channel form whose closed faces are disposed outwardly and whose open faces are disposed inwardly relative to each other, said handle portions extending within said respective channels throughout said overlapping zone, detachable cutting blades cooperatively associated respectively with said frame members and having respectively oppositely outwardly extending bearing portions rigid therewith and journaled in bores provided in said frame members concentric with said pivot axis, a bushing sleeve journaled within said bushing portions, a pair of pivot sleeves provided with head portions engaging respective exterior faces of said frame members and stem portions extending inwardly toward each other within said bushing sleeve and spaced apart axially, and a pivot screw passing freely through one of said pivot sleeves and having an inwardly extending end threadingly engaging interiorly of a hollow expansible stem being provided on the inner end of the other of said pivot sleeves, the respective diameters of said pivot screw and interior threads of said stem being so proportioned that the axial movement of said screw within said stem will cause the latter to expand into gripping engagement within said bushing sleeve to thereby lock said screw and pivot sleeve and bushing sleeve rigidly together, said pivot means passing through said handle portions, said jaw portions and said blades and securing said parts in operative relation.

5. Shears comprising a pair of frame members, each of said frame members including a plastic handle portion and a sheet metal jaw portion overlapping in a zone surrounding the pivot axis of said shears, said sheet metal jaw portions being of channel form whose closed faces are disposed outwardly and whose open faces are disposed inwardly relative to each other, said handle portions extending within said respective channels throughout said overlapping zone, detachable cutting blades cooperatively associated respectively with said frame members and having respectively oppositely outwardly extending bearing portions rigid therewith and journaled in bores provided in said frame members concentric with said pivot axis, a bushing sleeve journaled within said bushing portions, a pair of pivot sleeves provided with head portions engaging respective exterior faces of said frame members and stem portions extending inwardly toward each other within said bushing sleeve and spaced apart axially, and a pivot screw passing freely through one of said pivot sleeves and having an inwardly extending end threadingly engaging interiorly of a hollow expansible stem being provided on the inner end of the other of said pivot sleeves, the respective diameters of said pivot screw and interior threads of said stem being so proportioned that the axial movement of said screw within said stem will cause the latter to expand into gripping engagement within said bushing sleeve to thereby lock said screw and pivot sleeve and bushing sleeve rigidly together, said pivot means passing through said handle portions, said jaw portions and said blades and securing said parts in operative relation, and the head of said last-mentioned sleeve and its adjacent frame member being provided with means for locking them together in respect to movement about said pivot axis.

6. Shears comprising a pair of frame members provided with registering holes and each of said frame members including a plastic handle portion and a sheet metal jaw portion overlapping in a zone surrounding its said hole, said sheet metal jaw portions being of channel form whose closed faces are disposed outwardly and whose open faces are disposed inwardly relative to each other, said handle portions extending within said respective channels throughout said overlapping zone, detachable cutting blades cooperatively associated respectively with said frame members, said blades having bearing portions rigid therewith and journaled in bores in said frame members, a bushing sleeve journaled within said bushing portions, a pair of pivot sleeves provided with head portions engaging respective exterior faces of said frame members and with stem portions extending inwardly toward each other within said bushing sleeve with their inner ends spaced apart axially, the stem of one of said pivot sleeves being freely disposed within said bushing sleeve, the stem of the other of said pivot sleeves being slitted transversely and screw threaded interiorly, and a pivot screw passing freely through said first pivot sleeve and provided with a threaded end in expanding engagement within the threaded slitted end of said second pivot sleeve to thereby firmly lock the latter within said bushing sleeve.

7. Shears comprising a pair of frame members provided with registering holes and each of said frame members including a plastic handle portion and a sheet metal jaw portion overlapping in a zone surrounding its said hole, said sheet metal jaw portions being of channel form whose closed faces are disposed outwardly and whose open faces are disposed inwardly relatively to each other, said handle portions extending within said respective channels throughout said overlapping zone, detachable cutting blades cooperatively associated respectively with said frame members, said blades having bearing portions rigid therewith and journaled in bores in said frame members, said bearing portions being oppositely outwardly tapered in decreasing diameter, an oppositely outwardly tapered bushing sleeve whose outer surface is correspondingly oppositely and outwardly tapered axially from a median zone journaled within said bushing portions and provided with a cylindrical bore, a pair of pivot sleeves provided with head portions engaging respective exterior faces of said frame members and with stem portions extending inwardly toward each other within said bushing sleeve with their inner ends spaced apart axially, the stem of one of said pivot sleeves being freely disposed within said bushing sleeve, the stem of the other of said pivot sleeves being slitted transversely and screw threaded interiorly, and a pivot screw passing freely through said first pivot sleeve and provided with a threaded end in expanding engagement within the threaded slitted end of said second pivot sleeve to thereby firmly lock the latter within said bushing sleeve.

CURTIS W. WEIDAUER.

REFERENCES CITED

The following references are of record in the file of this patent:

UNITED STATES PATENTS

| Number | Name | Date |
|---|---|---|
| 780,526 | Reitz | Jan. 24, 1905 |
| 837,997 | Zeller | Dec. 11, 1906 |
| 995,090 | Piper | June 13, 1911 |
| 1,778,346 | Zeidler | Oct. 14, 1930 |
| 1,783,583 | Ralston | Dec. 2, 1930 |
| 1,955,134 | Kowalski | Apr. 17, 1934 |
| 2,284,664 | Kissling | June 2, 1942 |
| 2,377,906 | Schaaff | June 12, 1945 |